United States Patent
Rodgers et al.

(10) Patent No.: US 10,406,794 B2
(45) Date of Patent: Sep. 10, 2019

(54) METHOD FOR IMPROVEMENT OF WEATHERABILITY OF OPEN AIR PROCESSED COMPOSITES

(71) Applicant: GM Global Technology Operations LLC, Detroit, MI (US)

(72) Inventors: William R. Rodgers, Bloomfield Township, MI (US); Hamid G. Kia, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 125 days.

(21) Appl. No.: 15/267,533

(22) Filed: Sep. 16, 2016

(65) Prior Publication Data

US 2018/0079191 A1 Mar. 22, 2018

(51) Int. Cl.
*B32B 37/10* (2006.01)
*B29C 70/46* (2006.01)
(Continued)

(52) U.S. Cl.
CPC ............... *B32B 37/10* (2013.01); *B29C 70/46* (2013.01); *B29C 71/02* (2013.01); *B32B 7/12* (2013.01);
(Continued)

(58) Field of Classification Search
CPC ........... B32B 37/10; B32B 7/12; B29C 70/46; B29C 71/02; B29K 2105/0044
See application file for complete search history.

(56) References Cited

U.S. PATENT DOCUMENTS 5,326,520 A * 7/1994 Franck ................ B29C 47/0021
156/244.19
5,334,450 A 8/1994 Zabrocki et al.
(Continued)

FOREIGN PATENT DOCUMENTS

CN 107825696 A 3/2018
DE 102017121132 A1 3/2018
(Continued)

OTHER PUBLICATIONS

Rainer Wolf and Bansi Lal Kaul, "Plastics, Additives," Ullmann's Encyclopedia of Industrial Chemistry, vol. 27, 619-671, first published 2000. (Year: 2000).*

(Continued)

*Primary Examiner* — Nicholas E Hill
(74) *Attorney, Agent, or Firm* — Harness, Dickey & Pierce, P.L.C.

(57) ABSTRACT

Compression molding methods for improving the durability and weatherability of a composite material are provided. The methods include disposing a protective surface film on a composite material; adhering the protective surface film to the composite material; and compression molding the protective surface film. The composite material comprises a thermoplastic polymer and a reinforcement material. The protective surface film comprises at least one stabilizer that minimizes or prevents degradation of the underlying composite material when exposed to ultraviolet radiation and/or heat. The composite material may be heated in an oven having an environment comprising oxygen. The protective surface film may be disposed on the composite material prior to the composite material entering the oven; while the composite material is in the oven; or after the composite material exits the oven.

18 Claims, 4 Drawing Sheets

(51) Int. Cl.
  *B29C 71/02* (2006.01)
  *B32B 7/12* (2006.01)
  *B32B 27/12* (2006.01)
  *B32B 27/34* (2006.01)
  *B32B 38/00* (2006.01)
  B29K 77/00 (2006.01)
  B29K 105/00 (2006.01)
  B29K 105/06 (2006.01)
  B29L 9/00 (2006.01)

(52) U.S. Cl.
  CPC .............. *B32B 27/12* (2013.01); *B32B 27/34* (2013.01); *B32B 38/0004* (2013.01); *B29K 2077/00* (2013.01); *B29K 2105/0044* (2013.01); *B29K 2105/06* (2013.01); *B29L 2009/00* (2013.01); *B32B 2307/712* (2013.01); *B32B 2377/00* (2013.01)

(56) References Cited

U.S. PATENT DOCUMENTS

| | | | |
|---|---|---|---|
| 6,877,193 | B2 | 4/2005 | Ottaviani et al. |
| 7,097,922 | B2 | 8/2006 | Shen et al. |
| 7,119,134 | B2 | 10/2006 | Reed et al. |
| 7,462,666 | B2 | 12/2008 | Ottaviani et al. |
| 7,589,143 | B2 | 9/2009 | Nazri et al. |
| 7,655,749 | B2 | 2/2010 | Mance et al. |
| 7,737,211 | B2 | 6/2010 | Ottaviani et al. |
| 7,896,190 | B2 | 3/2011 | Berger et al. |
| 7,939,595 | B2 | 5/2011 | Nazri et al. |
| 7,985,830 | B2 | 7/2011 | Mance et al. |
| 8,297,091 | B2 | 10/2012 | Morales |
| 8,383,200 | B2 | 2/2013 | Xiao et al. |
| 8,496,993 | B2 | 7/2013 | Xiao |
| 2006/0106147 | A1 | 5/2006 | Fasulo et al. |
| 2006/0199890 | A1 | 9/2006 | Fasulo et al. |
| 2006/0281873 | A1* | 12/2006 | Alting .................... A63C 5/124 525/432 |
| 2007/0299185 | A1 | 12/2007 | Ottaviani et al. |
| 2009/0047489 | A1 | 2/2009 | Grummon et al. |
| 2010/0098925 | A1 | 4/2010 | Fasulo et al. |
| 2011/0272238 | A1 | 11/2011 | Basu et al. |
| 2012/0118424 | A1 | 5/2012 | Cannon et al. |
| 2014/0261976 | A1* | 9/2014 | Imoto .................. B60C 1/0008 156/134 |
| 2014/0349127 | A1* | 11/2014 | Minamide ......... C04B 35/63408 428/451 |

FOREIGN PATENT DOCUMENTS

| | | | |
|---|---|---|---|
| JP | 2006073793 A | 3/2006 | |
| WO | WO-0126874 A1 * | 4/2001 | ......... B29C 37/0025 |

OTHER PUBLICATIONS

Peter Schmitz and Siegfried Janocha, "Films," Ullmann's Encyclopedia of Industrial Chemistry, vol. 14, 649-676, first published 2000. (Year: 2000).*

Holbery, James, and Dan Houston. "Natural-fiber-reinforced polymer composites in automotive applications." Jom 58.11 (2006): 80-86. (Year: 2006).*

* cited by examiner

METHOD FOR IMPROVEMENT OF WEATHERABILITY OF OPEN AIR PROCESSED COMPOSITES

FIELD

The present disclosure relates to a method for improvement of weatherability of open air processed composites.

INTRODUCTION

This section provides background information related to the present disclosure which is not necessarily prior art.

Improving weatherability and robustness of polymeric composites components exposed to environmental conditions, such as ultraviolet light and heat, is useful for various applications, including in the automotive, marine, aviation/aerospace, industrial, commercial, and agricultural industries, among others. When certain thermoplastic polymeric materials are processed, there is a potential for the polymeric chain to react with atmospheric oxygen and eventually form free radicals leading to degradation of the polymer in the composite material.

In particular, in open air processes where the thermoplastic material is heated during processing, there is an increased chance that the polymeric chain will react with atmospheric oxygen to form free radicals because the polymeric material is processed in a furnace/oven and then after being heated, is transferred, either manually or robotically, from the furnace/oven or heat source to a compression mold. Any exposure of the polymeric material to atmospheric oxygen provides an opportunity to form free radical precursors. For instance, the heated surface of the thermoplastic polymeric material may react with atmospheric oxygen to form alkoxy, peroxy, and hydroperoxy moieties, which are free radical precursors that can be easily transformed to free radicals. For example, exposure to ultraviolet light and/or heat can cause free radical precursors to degrade and from free radicals.

The formed free radicals may react with the polymeric material and break the polymer chain thereby causing the molecular weight to be reduced. The formed free radicals may cause the molecular weight of the polymeric material to be reduced to a point where the polymeric material becomes weakened or degrades. Alternatively, the formed free radicals may react with the polymeric material and break the polymer chain thereby causing the polymer chains to react with each other in an uncontrolled crosslinking reaction. The crosslinking reactions embrittles the surface of the polymeric material creating the potential for it to craze, crack, and eventually, erode. In processes such as injection molding, free radical formation has traditionally been curtailed by limiting the amount of oxygen prevalent in the system while the polymer is heated. For instance, the amount of oxygen may be controlled by the use of an inert atmosphere oven.

Thus, using open air processing of heated thermoplastics has generally been avoided. It would be desirable to have a process that improves the durability, weatherability, and appearance of thermoplastic polymeric material composites, while being able to use an open air processes during their formation.

SUMMARY

This section provides a general summary of the disclosure, and is not a comprehensive disclosure of its full scope or all of its features.

In various aspects, the present disclosure provides a method for the improvement of the durability and weatherability of open air processed composites. In one aspect, the method may include disposing a protective surface film on a composite material, which includes a thermoplastic polymer and a reinforcement material. The protective surface film includes at least one stabilizer that minimizes or prevents degradation of the composite material when exposed to at least one of ultraviolet radiation or heat. The method also includes adhering the protective surface film to the composite material when the composite material is heated. The method further includes compression molding the protective surface film and the composite material in a mold.

In other aspects, the present disclosure also provides another method for improving the durability and weatherability of composite material. The method includes disposing a protective surface film on a composite material. The composite material includes a thermoplastic polymer, which is a second polymer, and a reinforcement material. The protective surface film includes a first polymer and at least one stabilizer that minimizes or prevents degradation of the composite material when exposed to at least one of ultraviolet radiation or heat. In certain aspects, the second polymer of the composite material and the first polymer of the protective surface film may be the same. The method also includes adhering the protective surface film to the composite material when the composite material is heated in an oven having an environment comprising air. The method further includes compression molding the protective surface film and the composite material in a mold.

Additionally, the present disclosure also provides a composite having improved durability and weatherability. The composite includes a composite material and a single layer protective polymer self-adhesive film. The composite material includes a thermoplastic polymer and a reinforcement material. The composite material defines a surface. The single layer of protective polymeric self-adhesive material includes the thermoplastic polymer and at least one stabilizer. The single layer protective polymeric self-adhesive material is disposed on the surface of the composite material to minimize or prevent degradation of the underlying composite material when exposed to at least one of ultraviolet radiation or heat.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 3A-3D are illustrations of a method of improving the durability and weatherability of a composite material according to certain aspects of the present disclosure, where a protective surface film is applied to a composite material in a continuous rolling process from a roll of protective surface film, which is cut using a blade.

FIGS. 4A-4C are illustrations of different variations of processes for forming a composite material in accordance with certain aspects of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Polymeric composites are widely used in many industries. For example, polymeric composites are increasingly being used as components in vehicles, such as automobiles, motorcycles, boats, tractors, buses, mobile homes, campers, and tanks, with efforts to further reduce vehicle mass. Reinforced polymeric composites are particularly suitable for use in components of an automobile or other vehicle (e.g., motorcycles, boats), but may also be used in a variety of other industries and applications, including aerospace components, industrial equipment and machinery, farm equipment, heavy machinery, by way of non-limiting example. For example, reinforced polymeric composites may be used to form automotive structural components having contoured or complex three-dimensional shapes. Non-limiting examples include gas tank protection shields, underbody shields, structural panels, door panels, interior floors, floor pans (e.g., of a cargo van), roofs, exterior surfaces, storage areas, including glove boxes, console boxes, trunks, trunk floors, truck beds, and the like.

As noted above, for composite articles prepared using an open air process there is an increased likelihood that the polymeric material will react with atmospheric oxygen while it is heated or molten, thus, increasing the potential to form free radical precursors. For instance, FIG. 1 exemplifies a simplified compression molding method where a composite material 20 comprising a thermoplastic polymer and a reinforcement phase is first heated in by a heat source 22 so that the polymer is pliable or flowable. The direction of movement of the composite material 20 through the heat source 22 is illustrated by arrow 18. The heat source 22 is a source of heat for heating the composite material and may be a furnace, an oven, or other heater. After traveling through the heat source 22, the heated composite material 20 is transferred, for example, by a robotic transfer equipment (not shown), to a press molding station 26. A compression mold 28 includes a lower die 30 having a first contoured surface 32 and an upper die 34 with a second contoured surface 36 complementary to the first contoured surface 32. The lower die 30 and upper die 34 are brought into contact with one another, pressure is applied, and the heated composite material 20 is compression molded therein to form a final part 38 having the three dimensional shape corresponding to the first and second contoured surfaces 32, 36 of the compression mold 28.

Figure 1:
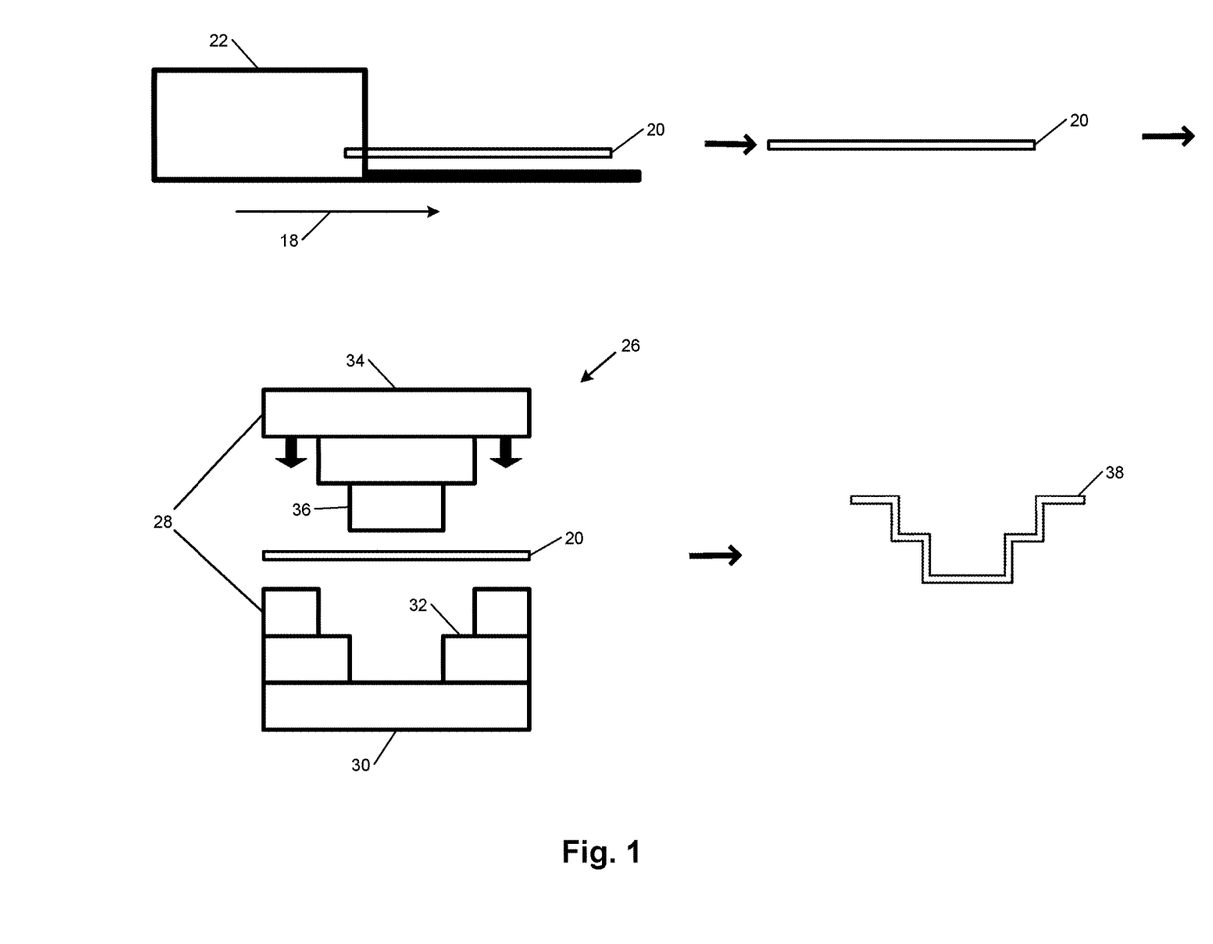
FIG. 1 is an illustration of an exemplary compression molding method.

The heated composite material 20 may be exposed to oxygen in the atmosphere during the heating process or the transferring process during which the heated composite material 20 is transferred to the press molding station 26. As noted above, when certain thermoplastic polymers are at higher temperatures (e.g., in the heated composite material 20), they may react with atmospheric oxygen at the surface to form alkoxy, peroxy, and hydroperoxy moieties. Alkoxy, peroxy, and hydroperoxy are free radical precursors, which easily degrade to form free radicals. Notably, ultraviolet radiation and/or heat can cause these free radical precursors to degrade and form free radicals within the composite material, potentially causing premature degradation and poor weatherability characteristics.

For example, the formed free radicals can react within the composite material 20 and break the polymer chains thereby causing the molecular weight of the composite material 20 to be reduced, which may occur to a point where the composite material 20 degrades and may no longer be suitable for its designated purpose. Alternatively or additionally, the free radicals formed may react with the composite material 20 to break the polymer chain therein causing the polymer chains to react with each other in an uncontrolled crosslinking reaction. The crosslinking reactions embrittles the surface of the polymeric material causing it to craze, crack, and eventually erode.

Minimizing precursor moiety/free radical formation when a thermoplastic polymer is heated during processing has occurred by reducing exposure and minimizing the amount of oxygen in the system in which the polymer is heated. For instance, the amount of oxygen has been controlled by using an inert atmosphere, for example, in the oven or furnace. In contrast, in certain aspects, the present disclosure provides a fabrication process in open air. For example, the present disclosure provides a compression molding process in open air that improves the durability and weatherability of the prepared composite articles.

In various aspects, the new method improves the durability and weatherability of composite articles prepared using open air processing methods such as thermoplastic compression molding, thermoplastic sheet molding, direct long fiber thermoplastic processing, and the like. The method involves disposing a protective surface film over the heated, softened, or molten charge (e.g., surface of the composite material). The protective surface film softens or melts and attaches to a surface of the composite material during the compression molding cycle. Thus, a layer of highly stabilized polymeric material covers the potentially oxidized surface of the heated composite material. Furthermore, even if the heated thermoplastic material is exposed to oxygen prior to being covered with the protective surface film, the protective surface film serves to minimize or block potential transformation of free radical precursor species to free radicals.

In other aspects, a layer of highly stabilized polymeric material, like the protective surface film, may be applied to other exposed surfaces of the composite material. For instance, the layer of highly stabilized polymeric material may be disposed on a second surface of the composite material, in addition to the protective surface film disposed on the heated, softened, or molten charge of the composite material described above.

The addition of a highly stabilized protective surface film improves the durability and weatherability of the formed composite articles. Additionally, the presence of the protective surface film improves the appearance of the formed composite articles. Furthermore, because the process does not require the use of an inert atmospheric oven, and because stabilization is needed only in the added protective surface film and not throughout the thickness of the composite article, the process is more efficient.

In certain aspects, a compression molding method for improving the durability and weatherability of a composite material is provided. First, a protective surface film is disposed on a composite material comprising a thermoplastic polymer and a reinforcement material. It should be noted that in alternative aspects, the protective surface film may be disposed on a thermoplastic material layer that does not include a reinforcement material. Thus, those of skill in the art will appreciate that the ensuing discussion regarding composite materials having a reinforcement material is equally applicable to polymeric materials lacking reinforcement materials, as well. The protective surface film comprises at least one stabilizer that minimizes or prevents degradation of the underlying composite material when exposed to ultraviolet radiation and/or heat. The protective surface film is adhered to a surface of the composite material. The adhering occurs when the composite material is in a heated state, for example, the latent heat from the composite material is transferred to the protective surface film to ensure adherence between the respective components. Then, the protective surface film and the composite material are compression molded in a mold where pressure is applied to create a contoured three-dimensional component.

Figure 2:
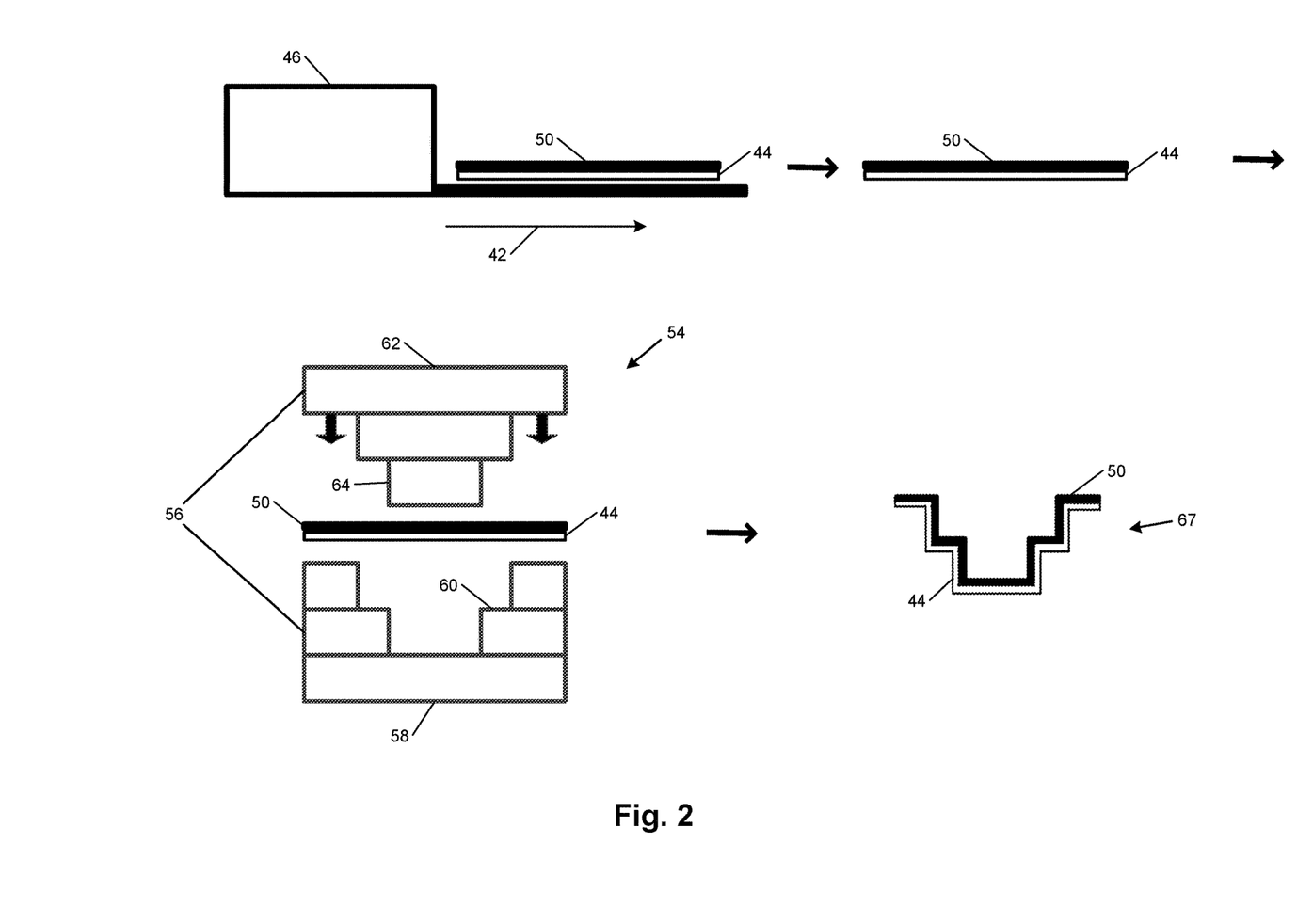
FIG. 2 is an illustration of a method of improving the durability and weatherability of a composite material according to certain aspects of the present disclosure.

An example of such a process is exemplified in FIG. 2. With reference to FIG. 2, a composite material 44 is shown after is has exited a heat source 46, which may be an oven or a furnace or another heat source. The composite material 44 is thus heated. The direction of movement of the composite material 44 through the heat source 46 is illustrated by arrow 42. The heat source 46 may have an environment comprising oxygen. The composite material 44 comprises at least one thermoplastic polymer and at least one reinforcement material. As the composite material 44 is heated, the polymeric material softens and/or melts along a surface. The composite material 44 optionally has an initial thickness (prior to heating) of greater than or equal to about 1 mm to less than or equal to about 10 mm. It is recognized that during heating, the overall thickness of the material may change due to lofting of the molten material. This lofting is a result of the melting of the polymer allowing the compressed fiber to straighten thereby increasing the overall thickness of the composite.

Suitable non-limiting examples of the at least one thermoplastic polymer comprising the composite material 44 include polyamides (including polycaprolactam (nylon)), polyester (including polyethylene terephthalate (PET)), polyurethane, polyolefin, poly(acrylic acid) (PAA), poly (methyl acrylate) (PMA), poly(methyl methacrylate) (PMMA), acrylonitrile butadiene styrene (ABS), polylactic acid (PLA), polybenzimidazole, polycarbonate, polyether sulfone (PES), polyetherether ketone (PEEK), polyetherimide (PEI), polyethylene (PE; including ultra-high molecular weight polyethylene (UHMWPE), medium-density polyethylene (MDPE), low-density polyethylene (LDPE), and cross-lined polyethylene (PEX)), polyphenylene oxide (PPO), polyphenylene sulfide (PPS), polypropylene (PP), polystyrene (PS), polyvinyl chloride (PVC), polytetrafluoroethylene (PTFE), co-polymers thereof, and any combinations thereof.

Suitable non-limiting examples of the at least one reinforcement material comprising the composite material 44 include carbon fibers, glass fibers (such as fiberglass or quartz), basalt fibers, aramid fibers (such as KEVLAR™ para-aramid synthetic fibers and TWARON™ para-aramid synthetic fibers), boron fibers, ceramic fibers, polyester fibers, ultra-high molecular weight polyethylene ("UHMWPE") fibers, cellulose or hemp fibers, and any combination thereof.

As appreciated by those of skill in the art, the composite material 44 may further include other ingredients, including other reinforcement materials, functional fillers or additive agents, like organic/inorganic fillers, fire-retardants, anti-ultraviolet radiation agents (UV stabilizers), anti-oxidants, colorants or pigments, such as carbon black powder, mold release agents, softeners, plasticizing agents, surface active agents, and the like.

The heat source 46 heats the composite material 44 to a temperature that is greater than or equal to about 20° C. higher than a crystalline melting point of the thermoplastic polymer to less than or equal to about 60° C. higher than the crystalline melting point of the thermoplastic polymer comprising the composite material 44. In certain aspects, the heat source 46 heats the composite material 44 to a temperature that is greater than or equal to about 45° C. higher than the crystalline melting point of the thermoplastic polymer to less than or equal to about 60° C. higher than the crystalline melting point of the thermoplastic polymer comprising the composite material 20. When the heating stops the composite material 20 gradually cools and hardens.

For example only, if the thermoplastic polymer in the composite material 44 is polyamide 6 that has a crystalline melting temperature of about 226° C., the heat source 46 may heat the composite material 44 to a temperature of greater than or equal to about 246° C. to less than or equal to about 286° C., and optionally to a temperature of greater than or equal to about 271° C. to less than or equal to about 286° C.

For example only, if the thermoplastic polymer comprising the composite material 44 is polyamide 66, having a crystalline melting temperature of about 269° C., the heat source 46 may heat the composite material 44 to a temperature of greater than or equal to about 289° C. to less than or equal to about 329° C., and optionally to a temperature of greater than or equal to about 314° C. to less than or equal to about 329° C.

A single-layer protective surface film 50 is disposed on the heated surface of the composite material 44. In certain aspects, the protective surface film 50 may comprise a first thermoplastic polymer that has the same composition as a second thermoplastic polymer in the composite material 44. In certain aspects, the first thermoplastic polymer in the protective surface film 50 may have a melting point similar to that of the second thermoplastic polymer in the composite material 44. The protective surface film 50 desirably stretches to accomodate the changes in length of the underlying composite material 44 charge during compression molding. Further, an adhesion strength of the protective surface film 50 can be measured as being approximately equivalent to a tear strength of the composite material 44.

If the polymer compositions differ between the composite material 44 and the protective surface film 50, the first thermoplastic polymer is not the same as the second thermoplastic polymer, the first thermoplastic polymer of the protective surface film 50 optionally has a crystalline melting temperature that is lower than the crystalline melting temperature of the second thermoplastic polymer of the composite material 44. In certain aspects, utilization of the protective surface film 50 with a first thermoplastic polymer composition having a crystalline melting temperature lower than a crystalline melting temperature of the second thermoplastic polymer of the composite material 44 ensures conformation of the protective surface film 50 to the heated surface of the composite material 44. For example only, the protective surface film 50 may comprise polyamide 6 as the first thermoplastic polymer while the composite material comprises polyamide 66 as the second thermoplastic polymer.

In certain aspects, the first thermoplastic polymer of the protective surface film 50 and the second thermoplastic polymer in the composite material 44 comprise the same polymer. Utilization of the same thermoplastic polymer in both the protective surface film 50 and the composite material 44 allows for greater compatibility between the composite material 44 and the protective surface film 50. Increased compatibility provides for greater adhesion strength between the composite material 44 and the protective surface film 50. In certain aspects, utilization of the same thermoplastic polymer or closely related thermoplastic polymers, with good miscibility and wetting of the charge (composite material surface), eliminates any need to utilize an adhesive tie layer to ensure proper adhesion of the protective surface film 50 to the composite material 44. Therefore, only a single layer of protective surface film 50 is used in certain aspects of the present disclosure.

The protective surface film 50 also comprises at least one stabilizer. The stabilizer may be at least one heat stabilizer and/or at least one ultraviolet radiation light stabilizer, which acts to minimize and/or prevent degradation of the underlying composite material 44 that would otherwise occur when the composite material 44 was exposed to at least one of ultraviolet radiation and/or heat. In certain aspects, the protective surface film 50 comprises one or more heat stabilizer(s) and one or more ultraviolet radiation stabilizer(s).

Two general categories of suitable heat stabilizers for use in the present protective surface films 50 include inorganic and organic. In general, stabilizers having higher molecular weight provide greater heat stability to the composite material 44. Inorganic heat stabilizers may be copper or potassium salt complexes and may be used singly or in combination. Suitable non-limiting commercial examples of inorganic heat stabilizers include copper-based antioxidant compounds commercially available as BRUGGLOEN™ H320 and BRUGGLOEN™ H3346. Inorganic heat stabilizer(s) may be present in amounts at greater than or equal to about 0.1 mass % to less than or equal to about 1.0 mass % of a total mass of the protective surface film 50.

In certain aspects, three sub-categories of organic heat stabilizers are suitable for use in the protective surface films: phenolic, phosphites, and phosphonates. The three sub-categories of organic heat stabilizers each comprise compounds having different chemical structures, but each desirably provides good protection from exposure of the composite material to heat. Further, certain stabilizers may include one or more of each of these classes of compounds. Organic heat stabilizers can perform by capturing oxygen in the thermoplastic polymer of the protective surface film 50, or by neutralizing the free radical precursors of the thermoplastic polymer of the composite material 44. Organic heat stabilizers may be present in amounts at greater than or equal to about 0.1 mass % to less than or equal to about 1.5 mass % of a total mass comprising the protective surface film 50.

Suitable non-limiting commercial examples of phenolic organic heat stabilizers include IRGANOX™ 1098, IRGANOX™ 1010, and IRGANOX™ 245. It is believed that IRGANOX™ 1098 comprises benzenepropanamide (N,N'-1,6-hexanediylbis[3,5-bis(1,1-dimethylethyl)-4-hydroxy). It is believed that IRGANOX™ 1010 comprises pentaerythritol tetrakis(3-(3,5-di-tert-butyl-4-hydroxyphenyl)propionate), while IRGANOX™ 245 comprises triethylene glycol bis(3-tert-butyl-4-hydroxy-5-methylphenyl) propionate. Suitable non-limiting commercial examples of phosphite organic heat stabilizers include IRGANOX™ 168 (believed to include tris(2,4-ditert-butylphenyl) phosphite) and BRUGGLOEN™ H10 (believed to include a phosphonate). Another suitable heat stabilizer is a phenolic based compound commercially available as BRUGGLOEN™ H161, which is believed to include sterically hindered phenolic antioxidants and phosphonates. Any of these stabilizers may be present at greater than or equal to about 0.1 mass % to less than or equal to about 1.0 mass % of a total mass of the protective surface film 50.

In other aspects, two categories of ultraviolet light stabilizers are suitable for use in the protective surface films: ultraviolet light absorbers ("UVA") and hindered amine light stabilizers ("HALS"). Three sub-categories of ultraviolet light absorbers are generally suitable: benzophenones, benzotriazole, and hydroxy phenyl triazines. Each ultraviolet radiation stabilizer is capable of absorbing the wavelengths of ultraviolet light and typically dissipates the absorbed energy, for example, as heat.

Suitable non-limiting examples of benzophenone ultraviolet light absorbers for use in the protective surface film 50 include UVINUL™ 3008, LOWILITE™ 20, CHIMASSORB™ 81, and CHIMASSORB™ 90. It is believed that UVINUL™ 3008 includes 2-hydroxy-4-octyloxybenzophenone, LOWILITE™ 20 includes 2-hydroxy-4-methoxybenzophenone, CHIMASSORB™ 81 includes 2-hydroxy-4-(octyloxy)phenyl]phenyl and CHIMASSORB™ 90 includes (2-hydroxy-4-methoxyphenyl)-phenylmethanone. Suitable non-limiting examples of hydroxy phenyl triazine ultraviolet light absorbers comprising the protective surface film 72 include TINUVIN™ 400, TINUVIN™ 460, TINUVIN™ 479, and TINUVIN™ 1600. It is believed that TINUVIN™ 400 includes a mixture of 2-[4-[(2-hydroxy-3-dodecyloxypropyl)oxy]-2-hydroxyphenyl]-4,6-bis(2,4-dimethylphenyl)-1,3,5-triazine and 2-[4-[(2-hydroxy-3-tridecyloxypropyl)oxy]-2-hydroxyphenyl]-4,6-bis(2,4-dimethylphenyl)-1,3,5-triazine, that TINUVIN™ 460 includes a hydroxyphenyl-triazine class compound, while TINUVIN™ 479 includes 2-[4-[4,6-bis([1,1'-biphenyl]-4-yl)-1,3,5-triazin-2-yl]-3-hydroxyphenoxy]. Hydroxy phenyl triazine ultraviolet light absorbers tend to be larger molecules, and therefore, have more thermal permanence than benzophenone ultraviolet light absorbers or benzotriazoles ultraviolet light absorbers.

Other suitable non-limiting examples of benzotriazole ultraviolet light absorbers for use in the protective surface film 50 include commercially available TINUVIN™ 234, TINUVIN™ 312, TINUVIN™ 1130, TINUVIN™ 328, TINUVIN™ 900, and UVINUL™ 3034. It is believed that TINUVIN™ 234 includes 2-(2H-benzotriazol-2-yl)-4,6-bis(1-methyl-1-phenylethyl), TINUVIN™ 312 includes N-(2-ethoxyphenyl)-N'-(2-ethylphenyl), and TINUVIN™ 1130 includes a mixture of b-[3-(2-H-Benzotriazole-2-yl)-4-hydroxy-5-tert.butylphenyl]-propionic acid-poly(ethylene glycol) 300-ester and bis{b-[3-(2-H-Benzotriazole-2-yl)-4-hydroxy-5-tert.butylphenyl]-propionic acid}-poly(ethylene glycol) 300-ester. It is believed that TINUVIN™ 328 includes 2-(2H-benzotriazol-2-yl)-4,6-ditertpentylphenol, while UVINUL™ 3034 includes 2-(2H-benzotriazole-2-yl)-4,6-bis(1-methyl-1-phenylethyl)phenol. Further, TINUVIN™ 900 is believed to include 2-(2-hydroxyphenyl)-benzotriazole. Benzotriazole ultraviolet light absorbers are suitable ultraviolet light absorbers, including red-shifted benzotriazoles. A suitable non-limiting example of a red-shifted benzotriazole ultraviolet light absorber is TINUVIN™ CARBOPROTECT.

Hindered amine light stabilizers are also suitable for use in the protective surface films 50 and are generally believed to form stable free radicals that react with the free radicals of the composite material 44 to form stable molecules, which in-turn regenerate stable free radicals. Suitable non-limiting examples of hindered amine light stabilizers include TINUVIN™ 144, TINUVIN™ 292, TINUVIN™ 770, CHIMASSORB™ 944, CHIMASSORB™ 2020, and UVINUL™ 4050. It is believed that TINUVIN™ 144 includes bis(1,2,2,6,6-pentamethyl-4-piperidyl) ((3,5-bis(1,1-dimethylethyl)-4-hydroxyphenyl)methyl)butylmalonate, TINUVIN™ 292 includes bis(1,2,2,6,6-pentamethyl-4-piperidyl) sebacate, TINUVIN™ 770 includes bis(2,2,6,6,-tetramethyl-4-piperidyl)sebaceate, CHIMASSORB™ 944 includes 2,2,6,6-tetramethyl-4-piperidyl)imino]-1,6-hexanediyl[(2,2,6,6-tetramethyl-4-piperidyl)imino], while UVINUL™ 4050 includes N,N'-bisformyl-N,N'-bis-(2,2,6,6-tetramethyl-4-piperidinyl)-hexamethylendiamine.

Thus, in certain aspects, at least one stabilizer is selected from the group consisting of: ultraviolet light absorbers, hindered amine radical agents, hindered phenol radical agents, peroxy and hydroperoxy radical scavengers, and any combination thereof. In certain aspects, the at least one heat stabilizer is selected from a group consisting of: copper-based complexes, phenolic compounds, phospite-containing compounds, phosponate-containing compounds, and combinations thereof; and/or the at least one light stabilizer is selected from the group consisting of benzophenones, benzotriazoles, hydroxyphenyl triazines, and combinations thereof.

In certain aspects, at least one heat stabilizer may be selected from the group consisting of: copper-based complexes or antioxidants, phenolic antioxidants, benzenepropanamide, pentaerythritol tetrakis(3-(3,5-di-tert-butyl-4-hydroxyphenyl)propionate), 4,5-Triethylene glycol bis(3-tert-butyl-4-hydroxy-5-methylphenyl)propionate, tris(2,4-ditert-butylphenyl) phosphite, phosphonates, and any combinations thereof; and the at least one light stabilizer may be selected from a group consisting of: 2-hydroxy-4-octyloxybenzophenone,-hydroxy-4-methoxybenzophenone, 2-hydroxy-4-(octyloxy)phenyl]phenyl,-, (2-hydroxy-4-methoxyphenyl)-phenylmethanone, 2-(2H-benzotriazol-2-yl)-4,6-bis(1-methyl-1-phenylethyl), N-(2-ethoxyphenyl)-N'-(2-ethylphenyl)-, b-[3-(2-H-Benzotriazole-2-yl)-4-hydroxy-5-tert.butylphenyl]-propionic acid-poly(ethylene glycol) 300-ester, bis{b-[3-(2-H-Benzotriazole-2-yl)-4-hydroxy-5-tert.butylphenyl]-propionic acid }-poly(ethylene glycol) 300-ester, 2-(2H-benzotriazol-2-yl)-4,6-ditertpentyl-phenol, 2-(2-hydroxyphenyl)-benzotriazole, 2-(2H-benzotriazole-2-yl)-4,6-bis(1-methyl-1-phenylethyl)phenol, 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, compounds within a hydroxyphenyl-triazine class, -[4-[4,6-bis([1,1'-biphenyl]-4-yl)-1,3,5-triazin-2-yl]-3-hydroxyphenoxy]-, bis(1,2,2,6,6-pentamethyl-4-piperidyl) ((3,5-bis(1,1-dimethylethyl)-4-hydroxyphenyl)methyl)butylmalonate, bis(1,2,2,6,6-pentamethyl-4-piperidyl) sebacate, bis(2,2,6,6,-tetramethyl-4-piperidyl)sebaceate, 2,2,6,6-tetramethyl-4-piperidyl) imino]-1,6-hexanediyl[(2,2,6,6-tetramethyl-4-piperidyl) imino], N,N'-bisformyl-N,N'-bis-(2,2,6,6-tetramethyl-4-piperidinyl)-hexamethylendiamine, and any combinations thereof.

In certain variations, the at least one stabilizer includes at least one heat stabilizer and at least one light stabilizer, where the at least one heat stabilizer is present at greater than or equal to about 0.1 mass % to less than or equal to about 1.5 mass % of a total mass of the protective surface film and the at least one light stabilizer is present at greater than or equal to about 0.25 mass % to less than or equal to about 10 mass % of a total mass of the protective surface film.

In certain other aspects, improved protection from ultraviolet radiation is believed to occur when a combination of ultraviolet light absorbers and hindered amine light stabilizers are used in the protective surface film 50. In certain instances, the ultraviolet radiation stabilizers are used in low concentrations. For example, the ultraviolet light stabilizers may be present at greater than or equal to about 0.1 mass % to less than or equal to about 0.5 mass % of a total mass of the protective surface film 50.

In certain instances, the concentration of the light stabilizers is dependent on the thickness of the protective surface film 50. In accordance with such, the light stabilizer may be present in significantly higher concentrations where the protective surface film 50 is thinner. By way of non-limiting example, in one aspect, the one or more UV light stabilizers may be present at greater than or equal to 0.25 mass % to less than or equal to about 10 mass % of a total mass of the protective surface film 50 when a thickness of the film is less than or equal to about 400 µm (micrometers).

As a film or layer becomes thicker, the concentration of stabilizer (e.g., UV absorber) introduced can be less while still protecting the underlying substrate. According to the Beer-Lambert law, for the same absorbing material, the absorbance of a material is proportional to a concentration multiplied by the path length (or thickness) of the protective film. Beer-Lambert Law states that a total absorbance of an absorber in a material is proportional to a thickness of the absorbing film (e.g., the protective surface film), a concentration of the particular absorbant, and an extinction coefficient of the absorbant (e.g., the effectiveness of material doing the absorbing of the light). This is often expressed as:

$$A = \varepsilon l c \quad (1)$$

where A is the absorbance (equal to 1 in this example), $\varepsilon$ is the extinction coefficient of the absorbant (a particular value for each absorbing species, but if the same absorbing species is used, it will be the same for all thicknesses and concentrations), l is the path length, or in this example, the thickness of the protective film, and c is the concentration of the absorbing material in the film.

By way of example, assuming that UV light is completely absorbed when the concentration of the absorbing species is 10 mass % and a thickness of the protective film is 10 µm; the following exemplary table can be constructed relating a concentration of the absorbing material (e.g., UV light stabilizer) to thickness of the film (e.g., protective surface film).

| Film Thickness (µm) | Absorber Concentration (mass %) |
| --- | --- |
| 10 | 10 |
| 20 | 5 |
| 40 | 2.5 |
| 80 | 1.25 |
| 160 | 0.625 |
| 320 | 0.313 |
| 400 | 0.25 |
| 500 | 0.20 |

As will be appreciated by those of skill in the art, there is a practical minimum amount of UV light stabilizer/absorber present in the film in order for the film to protect itself. So the concentration of the absorber desirably does not fall below this minimum level.

Therefore if the protective film/coating thickness is reduced by 50%, for example from 80 µm to 40 µm; a concentration of the absorbing material can be increased by a factor of 2, for example from 1.25 mass % to 2.5 mass %; in order to provide the same protection from ultraviolet light.

The protective surface film 50 generally has a thickness of greater than or equal to about 10 µm to less than or equal to about 1000 µm. In certain aspects, the protective surface film 50 has a thickness of greater than or equal to about 25 µm to less than or equal to about 500 µm, optionally In certain aspects, the protection surface film 50 has a thickness of greater than or equal to about 25 µm to less than or equal to about 100 µm. For example only, for a protective surface film 50 having a thickness of 80 µm, a concentration of about 1.25 mass % of light stabilizers is appropriate.

The addition of the protective surface film 50 provides a layer of highly stabilized polymeric material to cover the underlying and potentially oxidized softened or molten surface of the composite material 44. In certain aspects, the addition of the protective surface film 50 improves the appearance of the composite articles and may further provide a further advantage in that stabilizers are used only in the protective surface film 50 and not throughout the entirety of the composite article. Thus, the composition of the composite article enables retaining mechanical/structural properties absent the presence of or exposure to stabilizers in the composite composition itself.

Once the protective surface film 50 is disposed on the composite material 44, a transfer device (not shown) transfers the composite material 44 with the protective surface film 50 to a press molding station 54. The press molding station 54 includes a compression mold 56. The compression mold 56 includes a lower die 58 having a first contoured surface 60 and an upper die 62 with a second contoured surface 64 complementary to the first contoured surface 60. The lower die 58 and upper die 62 are brought into contact with one another, pressure is applied, and the heated composite material 44 and the protective surface film 50 are compression molded therein to form a final part 67 having the three dimensional shape corresponding to the first and second contoured surfaces 60, 64 of the compression mold 56. The compression mold 56, in certain aspects, finalizes the adhesion of the protective surface film 50 to the composite material 44. After exiting the press molding station 54, in certain aspects, the adhesion force between the protective surface film 50 and the composite material 44 is high enough that the protective surface film 50 cannot be removed without cohesive failure of either the composite material 44 or the protective surface film 50. The adhesion force may be determined using the delamination test.

FIGS. 3A-3D are illustrations of a method of improving the durability, weatherability, and appearance of a composite material 70 according to certain aspects of the present disclosure, where a protective surface film 72 is disposed on the composite material 70 after the composite material 70 exits a heat source 74, such as an open air oven, and in a continuous rolling process from a roll of protective surface film 76.

In FIGS. 3A-3D, the protective surface film 72 is coupled to an indexing film clamp 78 that translates laterally. The protective surface film 72 is unrolled from the roll of protective surface film 76 and disposed on the composite material 70 as the composite material 70 exits the heat source 74. The direction of movement of the composite material 70 through the heat source 74 is illustrated by arrow 69. The heat source 74 may comprise a ledge 80 extending horizontally from the heat source 74. The ledge 80 supports the composite material 70 as it exits the heat source 74 and as the protective surface film 72 is joined on the heated surface of the composite material 70. The protective surface film 72 is unrolled from the roll of protective surface film 76 and joining with the composite material 70 begins when the composite material 70 makes contact with the indexing film clamp 78 upon exiting the heat source 74.

As the protective surface film 72 is disposed on the composite material 70, at least one roller 84 applies force to both the protective surface film 72 and the composite material 70. The at least one roller 84 assists in the adhesion of the protective surface film 72 to the composite material 70. In certain aspects, the at least one roller 84 acts to remove air and reduce the potential for air bubbles between the protective surface film 72 and the composite material 70. For example only, the at least one roller 84 may be a TEFLON™ polytetrafluorethylene coated roller. The amount of pressure applied by at least one roller 84 is dependent upon the size of the at least one roller 84, the size of the machinery holding the at least one roller 84, and the desired height of the combined composite material 70 and the protective surface film 72. In certain aspects, the force applied by the at least one roller 84 on the composite material 70 and the protective surface film 72 will be equal to that of gravity. For example only, if the at least one roller 84 weighs 1 Kg the force applied by the at least one roller 84 will be about 10 N (9.8 N to be exact). The force applied by the at least one roller 84 is not believed to spread the softened or molten charge on the surface of the composite material 70. However, in certain aspects, the amount of force applied by the at least one roller 84 is sufficient to join the protective surface film 72 to the composite material 70, while also forcing out excess gas at the interface between the protective surface film 72 and heated surface of the composite material 70. After passing by the at least one roller 84, the process of adhering the protective surface film 72 to the heated composite material 70 is begun, which in certain aspects, may be completed when the assembly of the adhered protective surface film 72 and composite material 70 are sufficiently cooled.

After adhesion of the protective surface film 72 to the composite material 70, the protective surface film 72 is optionally cut using a draw knife 86. Alternatively, in other embodiments, the protective surface film 72 may be cut using other methods. For example only, the protective surface film 72 may be cut using a pinch point or a shear edge. Once the protective surface film 72 is cut, a transfer device (not shown), may transfer the composite material 70 with the protective surface film 72 to a press molding station (not shown) to be molded to form the desired final part (not shown).

Figure 3A:
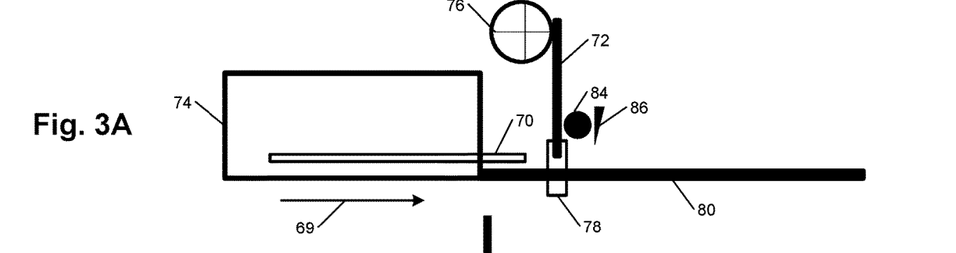
FIG. 3A shows the composite material as it begins to exit the oven, but has not yet made contact with the indexing film clamp.

FIG. 3A illustrates the composite material 70 as it begins to exit the heat source 74, but has not yet made contact with the indexing film clamp 78 to cause the disposing of the protective surface film 72 (as it is unrolled from the roll of protective surface film 76) on the heated (e.g., softened or molten) surface of the composite material 70.

Figure 3B:
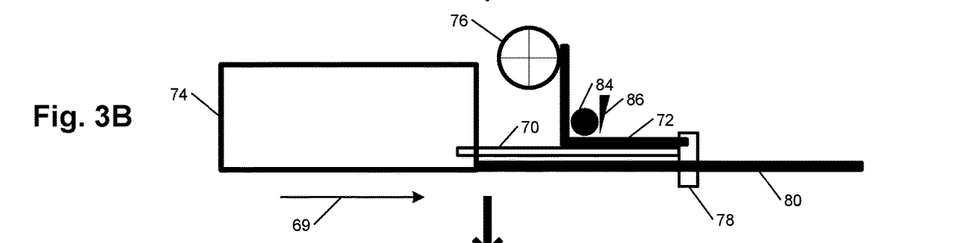
FIG. 3B shows the composite material after is has substantially exited the oven and has made contact with the indexing film clamp.

FIG. 3B illustrates the composite material 70 as it has substantially exited the heat source 74 and has made contact with the indexing film clamp 78 to cause the protective surface film 72 (as it is unrolled from the roll of protective surface film 76) to be disposed on the heated (e.g., softened or molten) surface of the composite material 70.

Figure 3C:
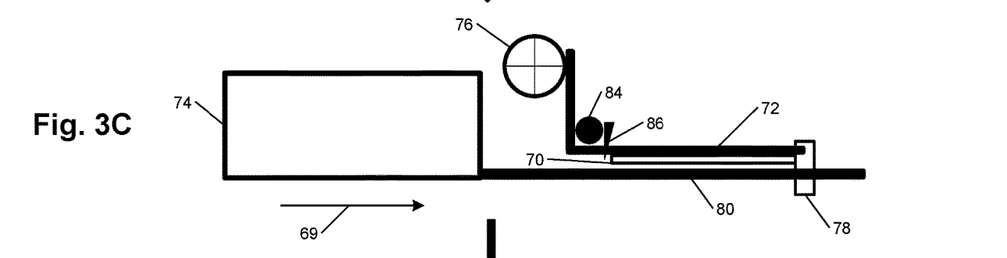
FIG. 3C shows the composite material after is has completely exited the oven.

FIG. 3C illustrates the composite material 70 after its entire length has exited the heat source 74 and the protective surface film 72 has adhered to the entire length of the composite material 70. The draw knife 86 cuts the protective surface film 72.

Figure 3D:
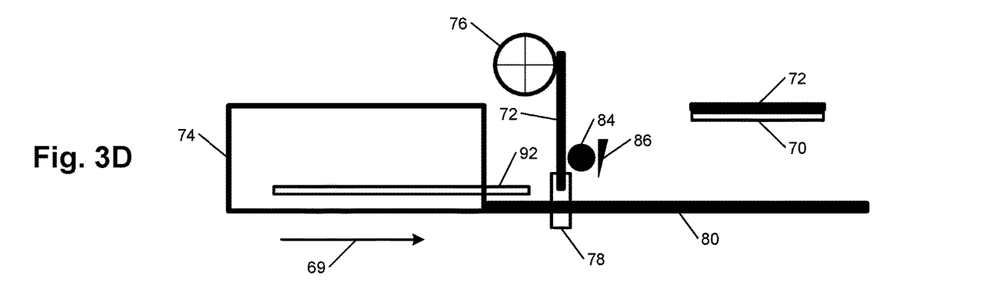
FIG. 3D shows the composite material after the protective surface film has been cut.

FIG. 3D illustrates the protective surface film 72 after it has been cut. At this moment, the transfer device (not shown) transfers the assembly of the composite material 70 with the adhered protective surface film 72 to the press molding station (not shown). Shortly after which, a second composite material 92 begins to exit the heat source 74 and the process is reinitiated with FIG. 3A.

Figure 4A:
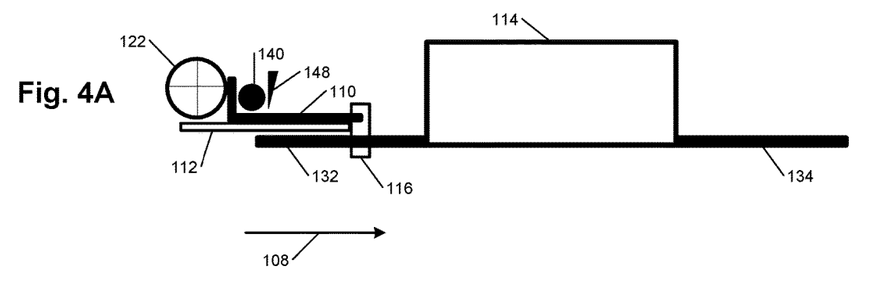
FIG. 4A is an illustration of a method of improving the durability and weatherability of a composite material according to certain aspects of the present disclosure, where the protective surface film is disposed on the composite material prior to the composite material being heated.
Figure 4B:
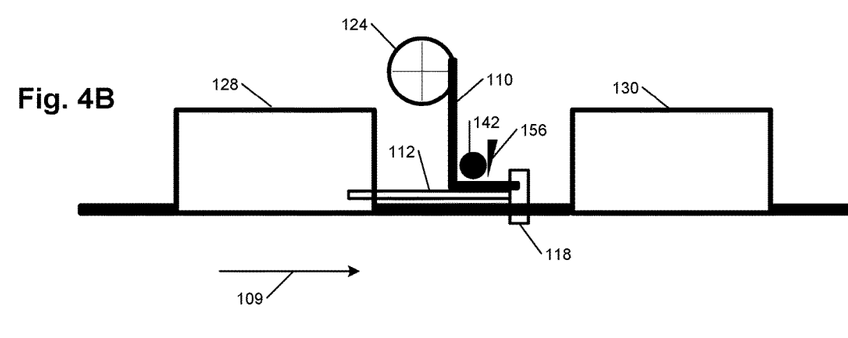
In FIG. 4B, the protective surface film is disposed on the composite material after the composite material has been at least partially heated.
Figure 4C:
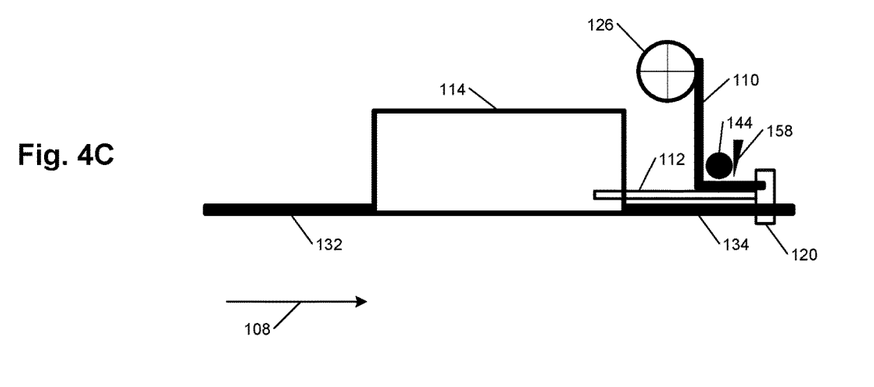
In FIG. 4C, the protective surface film is disposed on the composite material after the composite material is heated.

FIGS. 4A-4C are illustrations of a method of improving the durability and weatherability of a composite material according to certain aspects of the present disclosure similar to that described in the context of FIGS. 2 and 3A-3D. In particular, FIGS. 4A-4C depict the various locations at which a protective surface film 110 may be disposed on a composite material 112 during the process. The protective surface film 110 may be disposed on the composite material 112 prior to the heating of the composite material 112, while the composite material 112 is being heated, or after the composite material 112 is heated.

In these instances, similar to the embodiments depicted in FIGS. 3A-3D, the composite material 112 is heated in a heat source 114, 128, 130, which may be an open air oven, and the protective surface film 110 is coupled to an indexing film clamp 116, 118, 120. The protective surface film 110 is dispensed from the roll of protective surface film 122, 124, 126 and disposed on the composite material 112. The protective surface film 110 is disposed on the composite material 112 when the composite material 112 makes contact with the indexing film clamp 116, 118, 120. In certain aspects, the protective surface film 110 may make contact with the indexing film clamp 116, 118, 120 before the composite material 112 enters the heat source 114, while the composite material 112 is being transferred from a first heat source 128 to a second heat source 130, or as the composite material 112 is exiting the heat source 114.

The heat source 114 may comprise a first and second ledge 132, 134 extending horizontally from the heat source 114 at its entrance and exit, respectively. The first ledge 132 and second ledge 134 may support the composite material 112 as it enters and exits the heat source 114, respectively. In certain aspects, the first ledge 132 may provide support as the protective surface film 110 is disposed on the composite material 112 before the composite material 112 enters the heat source 114. In certain aspects, the second ledge 134 provides support as the protective surface film 110 is disposed on the composite material 112 as the composite material 112 exits the heat source 114. The direction of movement of the composite material 112 through the heat source 114 is illustrated by arrow 108.

In certain aspects, there may be a first heat source 128 and a second heat source 130. The direction of movement of the composite material 112 through the first heat source 128 and the second heat source 130 is illustrated by arrow 109. In such instances, a first ledge 150 may extend horizontally from the entrance of the first heat source 128. A second ledge 152 may extend horizontally between the first heat source 128 and the second heat source 130. A third ledge 154 may extend horizontally from the exit of the second heat source 130. The first ledge 150, the second ledge 152, and the third ledge 154 provide support to the composite material 112 in certain instances. In certain aspects, the first ledge 150 provides support as the protective surface film 110 is disposed on the composite material 112 before the composite material 112 enters the heat source 114. In certain aspects, the second ledge 152 provides support as the protective surface film 110 is disposed on the composite material 112 as the composite material 112 is being transferred form the first heat source 128 to the second heat source 130. In certain aspects, the third ledge 154 provides support as the protective surface film 110 is disposed on the composite material 112 as the composite material 112 exits the second heat source 130.

At least one roller 140, 142, 144 may be used to apply force to both the protective surface film 110 and the composite material 112 as the protective surface film 110 is applied to the composite material 112. The at least one roller 140, 142, 144 aids in the adhesion of the protective surface film 110 to the composite material 112. After the protective surface film 110 has adhered to the entire length of the composite material 112, the protective surface film 110 is optionally cut using a draw knife 148, 156, 158.

FIG. 4A exemplifies an instance where the composite material 112 makes contact with the indexing film clamp 116 causing the protective surface film 110 to be disposed from the at least one roller 140 on the composite material 112 before the composite material 112 enters the heat source 114. In such instances, both the composite material 112 and the protective surface film 110 are heated together in the heat source 114, which may be an open air oven.

FIG. 4B exemplifies an instance where the composite material 112 makes contact with the indexing film clamp 118 causing the protective surface film 110 to be disposed from the at least one roller 142 on the composite material 112 after the composite material 112 has exited the first heat source 128 and before the composite material 112 enters the second heat source 130. In such instance, the composite material 112 is heated by the first heat source 128, which may be an open air oven. The protective surface film 110 is then deposed on the heated composite material 112 and the composite material 112 and the protective surface film 110 are then heated together in the second heat source 130, which may be an open air oven.

FIG. 4C exemplifies an instance where the composite material 112 makes contact with the indexing film clamp 120 causing the protective surface film 110 to be disposed on the composite material 112 after the composite material 112 exits the heat source 114. In such instances, the protective surface film 110 shares the residual or latent heat of the composite material 112, but is not itself heated.

In all instances shown in FIGS. 4A-4C, once the protective surface film 110 is disposed on the composite material 112 and the composite material 112 is heated, regardless of the order of joining, the transfer device (not shown) transfers the assembly of the composite material 112 with the protective surface film 110 to the press molding station (not shown) to be molded to form the desired final part (not shown).

The composition and thickness of the protective surface film 110 may be determinative of the location where the protective surface film 110 is desirably disposed on the composite material 112. For example, as the thickness of the protective surface film 110 increases, the heat needed to ensure proper adhesion of the protective surface film 110 to the composite material 112 may increase. Conversely, as the thickness of the protective surface film 110 decreases, the heat needed to ensure proper adhesion of the protectives surface film 110 to the composite material 112 may decrease. Thus, where greater heating is needed, applying a thicker protective surface film 110 prior to entry into the heat source may be advantageous. Conversely, where less heating is needed to obtain good adhesion, applying a thinner protective surface film 110 can be achieved by applying the protective surface film on the composite material after the heated composite material exits the heat source.

A protective surface film 110 having a greater thickness is optionally disposed on the composite material 112 prior to the composite material 112 entering the heat source 114, as seen in FIG. 4A; or shortly after the composite material 112 enters the open air oven (not shown). In such instances, the protective surface film 110 itself is heated. While a protective surface film 110 having a lesser thickness will be disposed after the composite material 112 exits the heat source 114, as seen in FIG. 4C; or shortly before the composite material 112 exits the heat source 114 (not shown). In such instances, the protective surface film 110 is heated minimally if at all. In instances where the protective surface film 110 is disposed on the composite material 112 after the composite material 112 is heated and exits the heat source 114, the protective surface film 110 itself is not heated, but instead the residual or latent heat of the heated composite material 112 is transferred to it. A protective surface film 110 having a middle thickness is optionally disposed on the composite material 112 while the composite material 112 is being transferred from a first heat source 128 to a second heat source 130. In such instances the protective surface film is disposed on a heated surface of the composite material 112, but is also heated with the composite material 112 as the composite material travels through the second heat source 130 in the direction of arrow 109.

As those skilled in the art will appreciate, additional heat sources having horizontally extending ledge may be included. In such instances, the skill artisan will recognize that a protective surface film may be disposed on a composite material at various locations along the continuum in any of the above described fashions. By way of non-limiting example, in such instances, the protective surface film may be disposed on the composite material before entering the one of the heat sources, while traveling between the heat sources, or while exiting and moving away from the heat sources.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compression molding method for improving the durability and weatherability of a composite material, the method comprising:
   disposing a protective surface film on a composite material comprising a thermoplastic polymer and a reinforcement material;
   heating the composite material in an oven comprising an oxygen environment;
   adhering the protective surface film to the composite material, wherein the adhering occurs during the heating;
   transferring the composite material and the protective surface film from the oven to a mold; and
   after the adhering, compression molding the protective surface film and the composite material in the mold, wherein the protective surface film comprises at least one stabilizer that minimizes or prevents degradation of the underlying composite material when exposed to ultraviolet radiation and/or heat.

2. The method according to claim 1, wherein the at least one stabilizer is selected from the group consisting of: ultraviolet light absorbers, hindered amine radical agents, hindered phenol radical agents, peroxy and hydroperoxy radical scavengers, and any combination thereof.

3. The method according to claim 2, wherein the at least one stabilizer is present at greater than or equal to about 0.1 mass % to less than or equal to about 10 mass % of a total mass of the protective surface film.

4. The method according to claim 1, wherein the at least one stabilizer includes at least one heat stabilizer and at least one light stabilizer.

5. The method according to claim 4, wherein the at least one heat stabilizer is selected from the group consisting of: copper-based complexes, phenolic compounds, phosphite-containing compounds, phosphonate-containing compounds, and combinations thereof; and/or
   the at least one light stabilizer is selected from the group consisting of benzophenones, benzotriazoles, hydroxyphenyl triazines, and combinations thereof.

6. The method according to claim 4, wherein the at least one heat stabilizer is present at greater than or equal to about 0.1 mass % to less than or equal to about 1.5 mass % of a total mass of the protective surface film; and
   wherein the at least one light stabilizer is present at greater than or equal to about 0.25 mass % to less than or equal to about 10 mass % of a total mass of the protective surface film.

7. The method according to claim 1, wherein the disposing of the protective surface film on the composite material occurs:
   (i) prior to the composite material entering the oven; or
   (ii) while the composite material is in the oven.

8. The method according to claim 1, wherein the heating comprises bringing the composite material to a temperature that is from greater than or equal to about 20° C. higher than a crystalline melting point of the thermoplastic polymer to less than or equal to about 60° C. higher than the crystalline melting point of the thermoplastic polymer.

9. The method according to claim 1, wherein the disposing and the adhering occur in a continuous rolling process including at least one roller, wherein the at least one roller applies a force to remove air from an interface between the protective surface film and the composite material.

10. The method according to claim 1, wherein the protective surface film is disposed on the composite material when the composite material makes contact with an indexing film clamp coupled to the protective surface film.

11. The method according claim 1, further comprising:
   cutting the protective surface film once it is disposed on the composite material using a draw knife, a pinch point, or a shear edge.

12. The method according to claim 1, wherein the thermoplastic polymer comprises a polyamide.

13. The method according to claim 1, wherein the protective surface film has a thickness of from greater than or equal to about 10 μm to less than or equal to about 1000 μm.

14. A compression molding method for improving the durability and weatherability of a composite material, the method comprising:
   disposing a protective surface film on a composite material comprising a thermoplastic polymer and a reinforcement material, wherein the thermoplastic polymer is a second polymer;
   adhering the protective surface film to the composite material, wherein the adhering occurs when the composite material is heated and the composite material is heated in an oven having an environment comprising oxygen;
   transferring the composite material and the protective surface film from the oven to a mold; and after the adhering, compression molding the protective surface film and the composite material in the mold, wherein the protective surface film comprises a first polymer and at least one stabilizer that minimizes or prevents degradation of the underlying composite material when exposed to ultraviolet radiation and/or heat, and wherein the first polymer and the second polymer are the same.

15. The method according to claim 14, wherein the at least one stabilizer is selected from the group consisting of: ultraviolet light absorbers, hindered amine radical agents, hindered phenol radical agents, peroxy and hydroperoxy radical scavengers, and any combination thereof, wherein the at least one stabilizer is present at greater than or equal to about 0.1 mass % to less than or equal to about 10 mass % of a total mass of the protective surface film.

16. The method according to claim 14, wherein the at least one stabilizer includes at least one heat stabilizer and at least one light stabilizer, wherein the at least one heat stabilizer is present at greater than or equal to about 0.1 mass % to less than or equal to about 1.5 mass % of a total mass of the protective surface film and the at least one light stabilizer is present at greater than or equal to about 0.25 mass % to less than or equal to about 10 mass % of a total mass of the protective surface film.

17. The method according to claim 14, wherein the disposing of the protective surface film on the composite material occurs:
(i) prior to the composite material entering the oven; or
(ii) while the composite material is in the oven.

18. A compression molding method for improving the durability and weatherability of a composite material, the method comprising:

disposing a protective surface film on a composite material comprising a thermoplastic polymer and a reinforcement material, the protective surface film defining a thickness of from greater than or equal to about 25 µm to less than or equal to about 100 µm the protective surface film comprising a first polymer comprising polyamide 6, and the thermoplastic polymer comprising a second polymer comprising polyamide 6;

adhering the protective surface film to the composite material, wherein the adhering occurs when the composite material is heated; and compression molding the protective surface film and the composite material in a mold, wherein the protective surface film comprises at least one stabilizer that minimizes or prevents degradation of the underlying composite material when exposed to ultraviolet radiation and/or heat.

* * * * *